Figure 1:
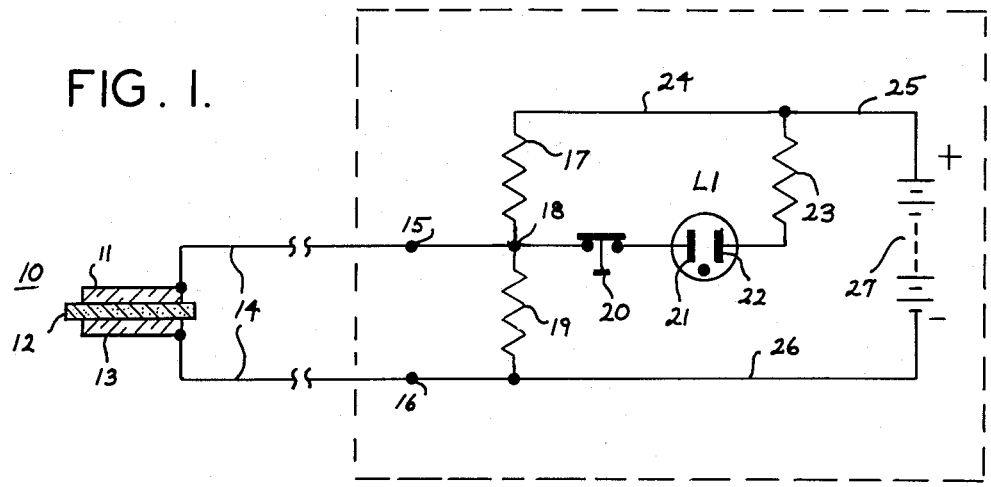

June 5, 1956 D. F. REAM 2,749,123
TARGET HIT INDICATOR
Filed Aug. 26, 1953

United States Patent Office 2,749,123
Patented June 5, 1956

2,749,123

TARGET HIT INDICATOR

Donald F. Ream, Washington, D. C.

Application August 26, 1953, Serial No. 376,717

12 Claims. (Cl. 273—102.2)

This invention relates to electrical target apparatus and has particular utility in target scoring for indicating bullet hits upon a target.

In certain types of target practice, a plurality of targets, usually five, is turned toward the contestant who is required to fire a bullet hit upon each target within a specified time limit. Since the targets are usually of the silhouette type having a large area and are located at a considerable distance from the firing line, an inordinate amount of time is consumed in the close examination required for scoring. To obviate this difficulty, I have invented a target hit indicator whereby bullet hits upon a target are immediately indicated at a location remote from the targets such as the firing line or referee's box.

This application is a continuation-in-part of my United States patent application Serial No. 316,965 filed October 27, 1952.

Heretofore, it has been the practice to employ, in some instances, mechanical means for determining target hits. The inaccuracies of such means stem from the uncertain amount of energy available to the tripping mechanism due to variations in bullet calibers, in powder charges and in the location of hits upon the large target area. More sensitive mechanical hit indicators have been evolved in which the bullet energy imparted to the target is used to close electrical switches for light or buzzer indication. Such means, however, are inherently inaccurate because of the aforementioned difficulties and are, in addition, subject to premature indication in a high wind or heavy rain. Still other hit indicating systems have been evolved in which the target consists of two electrically conductive plates separated by a dielectric. As the bullet penetrates such a target, the two plates are momentarily connected by the metallic projectile to produce an electrical transient of extremely short duration which can be used in suitable circuits for hit indication. Practically all such systems, however, require expensive high-frequency cable connections of limited length between the target and the control unit and, in addition, use the targets as a series switch in highly sensitive circuits with attendant difficulties due to target resistance changes caused by temperature, humidity and ageing effects, the result of such effects being premature and erratic operation of the hit indication system.

It is an object of this invention to provide a target hit indicator capable of giving an exceedingly accurate and reliable indication of when a target has been struck.

Another object of this invention is to provide a target hit indicator, the indicator portion of which may be located at any reasonable distance from the target without impairing the accuracy or operation of the system.

It is a further object of this invention to provide a target hit indicator which is not affected by wide variations in weather conditions.

Still another object of this invention is to provide a target hit indicating apparatus which is simple and efficient in operation and easy to maintain in proper working order.

Figure 2:
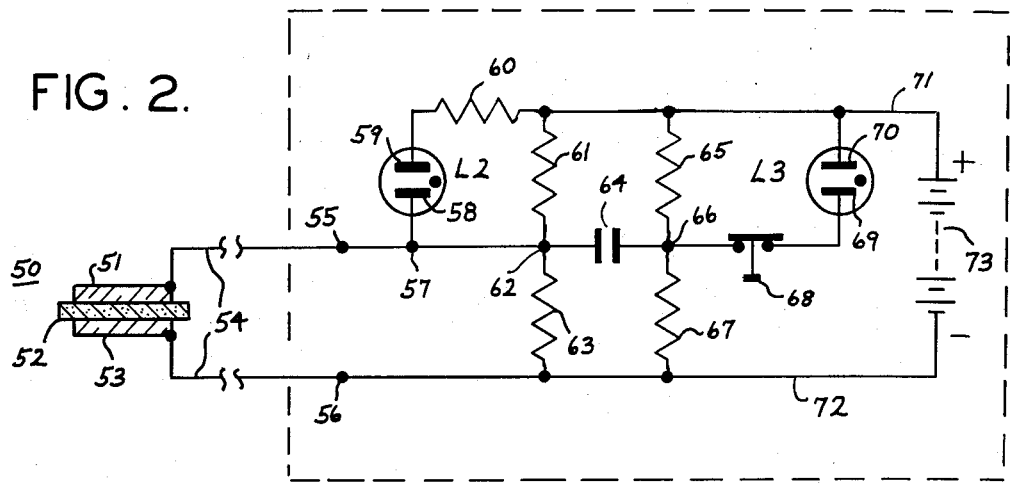

Still further objects and advantages of this invention will be readily apparent from the following specification taken in conjunction with the drawings in which:

Fig. 1 is a schematic wiring diagram of a target hit indicator embodying the present invention; and Fig. 2 is a schematic wiring diagram of another embodiment of the present invention.

In accomplishing the objects of this invention, I provide a target indicating system having a target and a control and indicating element capable of being placed at a location remote from the target. Any one of a number of various types of targets capable of giving an electrical indication of when they have been struck may be used; for purposes of illustration I have shown a target which is of the type having two conductive plates separated by a dielectric and known in the art since 1892.

Such type target usually consists of two electrically conductive plates or electrodes separated by dielectric material of a thickness somewhat less than the length of the bullet or projectile used in target practice. A voltage is impressed across the plates of the target so that the target acts as a large condenser. When the target is pierced by a bullet, the two plates will be momentarily short-circuited by the bullet and the charge on the plates will be dissipated, thereby creating a high-frequency discharge pulse. If the target is located any substantial distance from the indicator portion of the circuit, or if connections between the two involve any great length of connecting wire, this high frequency discharge pulse will be greatly attenuated and will be of little or no use in affording reliable indication.

After the target plates are discharged, they will start to charge again as soon as the short circuit is removed (i. e. the bullet leaves the target), resulting in a charging transient pulse of much lower frequency and consequently longer time base than the discharge transient pulse. This charging pulse, being of a much longer time base than the discharge pulse, will not be attenuated to any great degree in the connecting cables between the target and the indicating circuit, as would the discharge pulse. By placing the target plates or electrodes in parallel with one leg of a resistance voltage divider network, it is possible to obtain a large voltage increase across the other leg of the voltage divider due to the flow of charging current to the target. This large voltage increase is then used in the remaining portion of the indicator circuit to initiate the discharge of a gas-filled tube, thereby initiating the action of the indicator circuit.

This gas-filled tube, upon discharge, affords an indication of when its associated target has been struck.

In the embodiments here shown, I use the gas-filled tube itself, which glows intensely when fired, to afford a visual indication of when its associated target has been struck, although it is to be understood that any suitable indicating means may be used. Both embodiments utilize neon lamps for the gas-filled tubes. These lamps require a potential difference or voltage between their electrodes of approximately 75 volts to fire them. After they have been fired, however, the lamps continue to fire at lower voltages down to a minimum of approximately 52 volts, below which value they cease firing.

Turning now to the drawings, and more particularly to Fig. 1, I show an embodiment utilizing a target 10, having two plates or electrodes of electrically conducting material 11 and 13, separated by a suitable dielectric material 12. In order to supply a steady-state potential difference to the electrodes of the target, any suitable D. C. source may be used. In the embodiment I use a standard dry cell battery 27 of approximately 90 volts, the terminals of which are connected to a voltage divider network comprising resistor legs 17 and 19 by means of leads 25, 24 and lead 26. A portion of the voltage across the divider is fed from junction terminal 18 of resistors 17 and 19 to terminal 15. Terminal 16 is connected to lead 26 and thereby to the negative terminal of battery 27. Terminals 15 and 16 are connected to target electrodes 11 and 13 respectively by means of cable 14 which may be any standard two conductor cable, such as lamp cord or twisted pair or the like. Connected between terminal 18 and electrode 21 of neon lamp L1 is normally-closed push-button switch 20. Connected between electrode 22 of neon lamp L1 and lead 25 connected to the positive terminal of battery 27 is current limiting resistor 23.

Under static conditions when the system is ready to operate but prior to the target being struck by a bullet, switch 20 is closed and the target electrodes 11 and 13 have a potential difference equal to the voltage across resistor 19. Assume for purposes of illustration that battery 27 has a voltage of 90 volts and that the voltage divider comprised of resistors 17 and 19 across battery 27 is so proportioned as to yield a voltage of 25 volts across resistor 19. The potential difference across resistor 17 under these conditions will equal 65 volts. Since electrodes 21 and 22 of neon lamp L1 are connected across resistor 17 through switch 20 and current limiting resistor 23 respectively and since no current flows through neon lamp L1, the potential difference between electrodes 21 and 22 is 65 volts. It is to be understood that different voltages might be used, depending upon the components used in the circuit.

To illustrate the operation of the circuit, assume that target 10 has been struck by a bullet. When this occurs the electrodes 11 and 13 will be short-circuited momentarily as the bullet passes through the target and the charge on these electrodes will be dissipated resulting in a high frequency transient pulse which will be substantially attenuated in the leads 14, and will have no effect upon the indicating circuit. It will be apparent that if the spacing between electrodes 11 and 13 is approximately ¼ inch and a bullet ½ inch in length and traveling at approximately 2,000 feet per second strikes the target, the length of time that the electrodes 11 and 13 are connected together by the bullet will be about 10 microseconds. This time interval is sufficient for the charge on the electrodes 11 and 13 to be largely dissipated. After the bullet has ceased to short electrodes 11 and 13 together, the power supply will act to charge electrodes 11 and 13 again through the voltage divider network, resulting in a momentary surge of charging current of a much longer time base than the discharge pulse. This charging current, in passing through resistor 17, will increase the voltage across resistor 17 and thereby cause the potential difference between electrodes 21 and 22 of neon lamp L1 to increase to a value sufficient to fire neon lamp L1. Immediately upon the firing of neon lamp L1, the potential difference betwen electrodes 21 and 22 will decrease to approximately 52 volts, due to the regulator characteristic of these type tubes while they are fired. Any suitable means might be used to indicate that neon lamp L1 has been ignited due to target 10 having been struck. In practice, I have found that the glow of the lamp itself is sufficiently strong to be readily perceptible to the naked eye and thus the neon lamp itself may act as the indicator. Subsequent to the firing of neon lamp L1 due to a bullet hit on target 10, the target electrodes 11 and 13 will act to regain their original value of charge and the potential difference between electrodes 11 and 13 will attain very nearly the original value of 25 volts, provided the current through neon lamp L1 is limited to a small quantity by means of resistor 23. Another function of resistor 23 is to limit the initial starting current through neon lamp L1 to within safe limits to provide for longer lamp life. After the referee has recorded the results, he opens switch 20 and extinguishes neon lamp L1. When switch 20 is closed, the circuit is in condition for the next course of target practice. Inasmuch as switch 20 is in series with neon lamp L1 and current limiting resistor 23, there will be only an exceedingly small change in the charge on the target by the actuation of switch 20.

A useful modification of the embodiment of my invention which is shown in Fig. 1 and described above is provided by redesign of the voltage divider network consisting of resistors 17 and 19 to provide static-condition voltages of, for example, 45 volts across resistor 17 and 45 volts across resistor 19 prior to the target being struck by a bullet. By this means the static-condition difference of potential between electrodes 21 and 22 of neon lamp L1 is changed from 65 volts as heretofore described to the value of 45 volts, the latter voltage being useful because it is less than the minimum potential difference required between electrodes 21 and 22 to sustain firing of neon lamp L1 after a bullet hit upon the target, as will be explained hereinafter. By means of the said redesign of the voltage divider network comprised of resistors 17 and 19, the potential difference across the target electrodes 11 and 13 is changed from 25 volts as heretofore described to 45 volts. Assuming now a bullet hit on target 10, target electrodes 11 and 13 will be discharged and then will commence to charge again as has been described. The resulting target charging current which flows through resistor 17 increases the potential difference between electrodes 21 and 22 to a value which fires neon lamp L1, however, subsequent recharging of the target electrodes after the bullet has passed through target 10 decreases the current through resistor 17 to the static value obtained before target 10 was struck. As the charging current through resistor 17 decreases, the voltage across resistor 17 decreases also, providing for the extinguishing of neon lamp L1 when the voltage of approximately 52 volts across resistor 17 is attained, the latter voltage being the minimum voltage required to maintain firing of neon lamp L1. Upon the extinguishing of neon lamp L1, the target electrodes continue to recharge and the circuit achieves the static condition necessary for the next course of fire without actuation of switch 20 being required as was the case heretofore. Normally-closed switch 20 serves no useful purpose in the said modification and may be omitted from the circuit by connecting electrode 21 of neon lamp L1 directly to terminal 18. The result of the modification described above, which is to be considered a part of my invention, is to provide a target hit indicator which scores a bullet hit upon a target by the momentary flash of the neon lamp and which adjusts itself to the static condition necessary for the next course of fire.

The embodiment of my invention shown in Fig. 1 utilizes the target 10 in parallel connection with resistor 19, said resistor being one leg of a voltage divider. Thereby, the resistance of the target between electrodes 11 and 13 is in parallel connection with resistor 19. Normally, the target resistance is much larger than resistor 19 and may be considered of infinite value when the voltage divider is proportioned to give the normal static-condition voltages across resistors 17 and 19 as described heretofore. For example, the target resistance may be several megohms and resistor 19 may be only 1,000 ohms. If, for any reason, the target resistance decreases, changes in the normal voltages across resistors 17 and 19 will occur, there being an increase in the voltage across resistor 17 which will tend to fire neon lamp L1 prematurely, i. e. before target 10 is struck by a bullet. Because of the parallel connection between target 10 and resistor 19, however, the voltage changes across resistors 17 and 19 will not be directly proportional to the target resistance changes. For example, assuming for purposes of illustration that resistor 19 is 1,000 ohms, the target resistance may decrease from a value of several megohms to a value of 10,000 ohms without producing more than approximately a 10% change in the normal voltages across resistors 17 and 19. In practice, it has been found that even greater changes in these voltages is possible without impairing operation of the circuit and that, by designing the voltage divider comprised of resistors 17 and 19 to be proportioned as heretofore described, keeping the resistance value of resistor 19 small, lower target resistances do not impair operation of the hit indicator. It is apparent, therefore, that exceedingly wide variations in target resistance caused by temperature, rain, humidity, ageing and like effects do not impair the accuracy and reliability of operation of my invention.

The embodiment of my invention shown in Fig. 2 utilizes a network of two voltage dividers which are interconnected by means of a condenser to provide for further protection against erratic operation of the target hit indicator as will be hereinafter explained. Two gas-filled tubes are utilized, one to indicate the resistance of the target and target leads and the other to indicate bullet hits upon the target. As in the previous embodiment, neon lamps are used for the gas-filled tubes to provide visual indication, although any suitable indicating means might be used.

Turning again to the drawings, and more particularly to Fig. 2, I show a target 50, of the same type used in the embodiment of Fig. 1, having plates or electrodes 51 and 53 separated by dielectric 52. The power supply source 73 may be any suitable D. C. supply. In the embodiment shown I utilize, for purposes of illustration, a standard dry cell battery of approximately 90 volts. The terminals of battery 73 are connected by means of leads 71 and 72 across a voltage divider comprising resistor legs 65 and 67. In the same manner, the terminals of battery 73 are connected across another voltage divider comprised of resistor legs 61 and 63. Junction terminal 62 of resistors 61 and 63 is connected to terminal 57 and to terminal 55. Terminal 56 is connected by means of lead 72 to the negative terminal of battery 73. Terminals 55 and 56 are connected to target electrodes 51 and 53 respectively by means of cable 54, which may be any two conductor cable such as lamp cord or twisted pair. Terminal 57 is connected to electrode 58 of neon lamp L2. Connected between electrode 59 of neon lamp L2 and lead 71 connected to the positive terminal of battery 73 is a current limiting resistor 60. Connected between terminal 62 and junction terminal 66 of resistors 65 and 67 is a coupling condenser 64. Normally closed push-button switch 68 is connected between terminal 66 and electrode 69 on neon lamp L3. Electrode 70 of neon lamp L3 is connected to lead 71 and thereby to the positive terminal of battery 73.

When the system is in the static condition necessary for operation but previous to the target being struck by a bullet, switch 68 is closed and target electrodes 51 and 53 have a potential difference equal to the voltage across resistor 63. Since neon lamp L2 is non-conducting in this condition, the potential difference between electrodes 58 and 59 of neon lamp L2 is equal to the voltage across resistor 61. The potential difference between electrodes 69 and 70 of neon lamp L3 is equal to the voltage across resistor 65. Assume for purposes of illustration that the voltage divider comprised of resistor legs 61 and 63 is so proportioned as to yield 45 volts across resistor 61 and 45 volts across resistor 63. Similarly, assume that the voltage divider comprised of resistor legs 65 and 67 is proportioned to yield 65 volts across resistor 65 and 25 volts across resistor 67. It is to be understood that different voltages might be used, depending upon the components used in the circuit.

The operation of the embodiment of Fig. 2 is explained by first assuming a bullet hit on target 50. The charge on target electrodes 51 and 53 will be dissipated and a charging current will flow through resistor 61 in the manner described heretofore. The momentary increase in voltage across resistor 61 caused by the charging current will increase the potential difference between electrodes 58 and 59 of neon lamp L2 to a value greater than necessary to fire neon lamp L2. The current through neon lamp L2 will be limited to a small value by current limiting resistor 60. The charging current to target 50 also causes a momentary decrease in voltage across resistor 63 which is transferred by means of coupling condenser 64 and appears across resistor 67. The resulting decrease in voltage across resistor 67 increases momentarily the voltage across resistor 65, thereby increasing the potential difference between electrodes 69 and 70 of neon lamp L3 to a value necessary to fire neon lamp L3. Immediately upon the firing of neon lamp L3, the potential difference between its electrodes 69 and 70 will decrease to approximately 52 volts due to the regulator characteristic of these type tubes when they are fired, and the current through neon lamp L3 will be limited by resistor 67. Subsequent recharging of target electrodes 51 and 53 after the bullet has passed through target 50 decreases the current through resistor 61 to the static value obtained before target 50 was struck. When the static current is attained, the voltage across resistor 61 is 45 volts which is insufficient to maintain firing of neon lamp L2 resulting in the extinguishing of neon lamp L2. The final result of a bullet hit on target 50 is, therefore, the firing of neon lamp L3. Any suitable means may be used to indicate the firing of neon lamp L3 and, thereby, a bullet hit upon the target. In practice, I have found that the glow of the neon lamp itself is satisfactory for this purpose. After the referee has scored the results, he opens switch 68 momentarily, thereby extinguishing neon lamp L3 and restoring the voltages across voltage divider resistors 65 and 67 to the static-condition values. When switch 68 is closed, neon lamp L3 remains extinguished and the circuit is in condition for the next course of fire.

The further protection provided by the embodiment of my invention shown in Fig. 2 against erratic and premature operation due to target resistance variations will now be described. Assume that the insulation provided by dielectric 52 between target electrodes 51 and 53 is imperfect due to temperature, rain, humidity and ageing effects. Such imperfections in the target dielectric will provide a target resistance in parallel with resistor 63 and result in variations of the static-condition voltage across resistor 63, thereby tending to cause premature firing of neon lamp L3 previous to target 50 having been struck by a bullet. Before variations in the voltage across resistor 63 can cause firing of neon lamp L3, however, they must be transferred by coupling condenser 64 to appear across resistor 67 as has been described heretofore. Since coupling condenser 64 has a high impedance to slowly varying voltages, it is apparent that such voltages will be attenuated by condenser 64, thereby preventing the firing of neon lamp L3. Thus coupling condenser 64 provides a frequency discrimination means to prevent erratic and premature actuation of the target hit indicator due to imperfections of target dielectric 52.

Neon lamp L2 of the embodiment of my invention shown in Fig. 2 provides a convenient and accurate means to show that the leads to the target and the electrodes of the target itself are not inadvertently shorted. If the resistances between target leads 54 and between target electrodes 51 and 33 are sufficiently low to cause an appreciable increase in static-condition current through resistor 61, the voltage across resistor 61 will increase. Since the static-condition potential difference between electrodes 58 and 59 of neon lamp L2 are equal to the voltage across resistor 61, as explained heretofore, it is apparent that a short or very low resistance between the target leads or target electrodes can cause the firing of neon lamp L2. Thus, in operation, when neon lamp L2 is extinguished, the fact that the target leads and target electrodes are sufficiently insulated is indicated. When neon lamp L2 fires, the fact that the target leads or target electrodes are insufficiently insulated is indicated, the indication in both cases being provided by neon lamp L2 itself, although any suitable means might be used.

The voltage divider network comprised of resistors 65 and 67 shown in Fig. 2 may be modified to provide voltages across resistor 65 of 45 volts and across resistor 67 of 45 volts, instead of the respective voltages of 65 volts and 25 volts as has been assumed heretofore. Such modification, as has been explained in the embodiment of Fig. 1, will result in a target hit indicator which scores a bullet hit on target 50 by the momentary flash of neon lamp L3 and which adjusts itself to the static condition necessary for the next course of fire without actuation of switch 68 being required.

One important feature of such arrangements as hereinbefore explained is the fact that I do not utilize my targets as a simple series switch, as in the prior art, and, consequently, the D. C. resistance and resistance stability of the targets is not important to proper operation. Exceedingly wide variations in this resistance due to dampness, heat, dielectric ageing effects, etc. will not affect either the operation or the accuracy of the system.

Another important feature of my invention is that, by using a low frequency charging pulse, the problem of attenuation of electric signals due to travel from the target to the indicator is non-existent, and accurate results have been obtained even when the targets have been separated from the indicator by distances greater than ¼ mile. Since ordinary lamp cord or twisted pair cable may be used, this obviously represents a great saving in equipment expense.

What I claim is:

1. A target shooting apparatus comprising a target, said target having a plurality of electrically conductive plates spaced apart and insulated from each other, a voltage divider network, said plates being connected across a part of said voltage divider network, means for connecting a power supply to said voltage divider network for charging said plates, said plates being adapted to be discharged by passage of a projectile through said target and an indicating means connected across another part of said voltage divider network and actuated by redistribution of voltage on said network caused by recharging of said plates following passage of a projectile therethrough.

2. A target shooting apparatus as defined in claim 1, in which the constants of said voltage divider network are so proportioned that the static-condition voltage across said indicating means is below that required for actuation of said indicating means but is sufficient to maintain said indicating means actuated.

3. A target shooting apparatus as defined in claim 1, in which the constants of said voltage divider network are so proportioned that the static-condition voltage across said indicating means is below that required for actuation of said indicating means and is also below that required to maintain said indicating means actuated.

4. A target shooting apparatus comprising a target, said target having a plurality of electrically conductive plates spaced apart and insulated from each other, a voltage divider network, said plates being connected across a part of said voltage divider network, means for connecting a power supply to said voltage divider network for charging said plates, said plates being adapted to be discharged by passage of a projectile through said target and a gaseous discharge tube indicating means connected across another part of said voltage divider network and actuated by redistribution of voltage on said network caused by recharging of said plates following passage of a projectile therethrough.

5. A target shooting apparatus comprising a target, said target having a plurality of electrically conductive plates spaced apart and insulated from each other, said target being adapted to be connected to a power supply source for charging said plates to establish a potential difference therebetween, a voltage divider interposed between the power supply source and said plates, said plates being connected across a part of said voltage divider, an indicating means connected across another part of said voltage divider, a reset switch in series with said indicating means, said parts of said voltage divider being so proportioned that the voltage across said other part of said voltage divider is normally insufficient to actuate said indicating means but is sufficient to maintain said indicating means actuated, said plates being adapted to be discharged by passage of a projectile through said target, said indicating means being actuated by a transient redistribution of voltage on said voltage divider upon recharging of said plates which causes the voltage across said other part of said voltage divider to increase to a value sufficient to actuate said indicating means, operation of said reset switch to open position being effective to discontinue operation of said indicating means.

6. A target shooting apparatus comprising a target, said target having a plurality of electrically conductive plates spaced apart and insulated from each other, a power supply source for charging said plates to establish a potential difference therebetween, a first and a second voltage divider connected across said power supply source, said plates being connected across a part of said first voltage divider, a first indicating means connected across another part of said first voltage divider for indicating the resistance between said plates, said parts of said first voltage divider being so proportioned that the static-condition voltage across said first indicating means is below that required to actuate said first indicating means when the resistance between said target plates is above a predetermined value and is above that required to actuate said first indicating means when the resistance between said plates is below a predetermined value, said plates being adapted to be discharged by passage of a projectile through said target, subsequent recharging of said plates causing a voltage redistribution on said first voltage divider, means coupling said first voltage divider to said second voltage divider, a second indicating means across a part of said second voltage divider for indicating passage of a projectile through said target, said redistribution of voltage on said first voltage divider being reflected through said coupling means into said second voltage divider to cause a redistribution of voltage on said second voltage divider, said second indicating means being actuated by said redistribution of voltage on said second voltage divider, said redistribution of voltage on said second voltage divider raising the voltage across said second indicating means to a value sufficient to actuate said second indicating means.

7. A shooting apparatus as defined in claim 6, in which the constants of said second voltage divider are so proportioned that the static-condition voltage across said second indicating means is below that required for actuation of said second indicating means but is sufficient to maintain said indicating means actuated.

8. A shooting apparatus as defined in claim 6, in which the constants of said second voltage divider are so proportioned that the static-condition voltage across said second indicating means is below that required for actuation of said second indicating means and is below that required to maintain said second indicating means actuated.

9. A shooting apparatus as defined in claim 6, in which said means coupling said first voltage divider to said second voltage divider consists of a frequency sensitive means whereby a redistribution of voltage on said first voltage divider occurring at a predetermined time rate of change is reflected through said coupling means to said second voltage divider to thereby cause actuation of said second indicating means.

10. A shooting apparatus as defined in claim 6, in which said means coupling said first voltage divider to said second voltage divider comprises a condenser, redistribution of voltage on said first voltage divider occurring above a predetermined time rate of change being reflected through said condenser coupling means into said second voltage divider to thereby cause a redistribution of voltage on said second voltage divider and actuation of said second indicating means.

11. A target shooting apparatus comprising a target, said target having a plurality of electrically conductive plates spaced apart and insulated from each other, said target being adapted to be connected to a power supply source for charging said plates to establish a potential difference therebetween, a voltage divider interposed between said power supply source and said plates, said plates being connected across a part of said voltage divider, a gaseous discharge tube indicating means connected across another part of said voltage divider, said parts of said voltage divider being so proportioned that the voltage across said other part of said voltage divider normally is below that required to fire said gaseous discharge tube indicating means but is sufficient to maintain said gaseous discharge tube indicating means fired, said plates being adapted to be discharged by passage of a projectile through said target, said gaseous discharge tube indicating means being fired by a redistribution of voltage on said voltage divider caused by recharging of said plates following passage of a projectile therethrough, said redistribution causing the voltage across said other part of said voltage divider to become sufficeint to fire said gaseous discharge tube indicating means.

12. A target shooting apparatus comprising a target, said target having a plurality of electrically conductive plates spaced apart and insulated from each other, said plates being adapted to be connected to a power supply source for charging said plates to establish a potential difference therebetween, a voltage divider interposed between the power supply source and said plates, said plates being connected across a part of said voltage divider, a gaseous discharge tube indicating means connected across another part of said voltage divider, said parts of said voltage divider being so proportioned that the voltage across said other part of said voltage divider is normally below that required to fire said gaseous discharge tube indicating means and is below that required to maintain said gaseous discharge tube indicating means actuated, said plates being adapted to be discharged by passage of a projectile through said target, said gaseous discharge tube means being fired by a transient redistribution of voltage on said voltage divider upon recharging of said target plates following passage of a projectile therethrough, said redistribution of voltage on said voltage divider causing the voltage across said other part of said voltage divider to increase to a value sufficient to fire said gaseous discharge tube indicating means, said voltage across said other part decreasing to a value below that necessary to maintain said indicating means fired when said target plates become substantially fully recharged.

References Cited in the file of this patent

UNITED STATES PATENTS

| | | |
|---|---|---|
| 474,109 | Vogel | May 3, 1892 |
| 2,576,960 | McAvoy | Dec. 4, 1951 |

FOREIGN PATENTS

| | | |
|---|---|---|
| 432,156 | Great Britain | July 22, 1935 |